(12) United States Patent
Jee

(10) Patent No.: US 6,902,636 B2
(45) Date of Patent: Jun. 7, 2005

(54) JOINING METHOD FOR FRAME OF SPECTACLES

(75) Inventor: Kwang Koo Jee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 10/047,136

(22) Filed: Jan. 15, 2002

(65) Prior Publication Data

US 2002/0112793 A1 Aug. 22, 2002

(30) Foreign Application Priority Data

Jan. 15, 2001 (KR) .......................................... 2001-2250

(51) Int. Cl.[7] .............................................. G02C 13/00
(52) U.S. Cl. .............................. 148/563; 29/20; 351/95; 351/178
(58) Field of Search ................................ 148/563, 402; 351/95, 113

(56) References Cited

U.S. PATENT DOCUMENTS

| | | | | |
|---|---|---|---|---|
| 4,758,285 A | * | 7/1988 | Hodgson et al. ............ | 148/563 |
| 4,983,029 A | * | 1/1991 | Sato .............................. | 351/41 |
| 6,077,368 A | * | 6/2000 | Nakamura et al. ........... | 148/563 |
| 6,511,174 B1 | * | 1/2003 | Rossin ......................... | 351/11 |
| 6,523,952 B1 | * | 2/2003 | Krumme ...................... | 351/110 |
| 2001/0028431 A1 | * | 10/2001 | Rossin ......................... | 351/83 |

FOREIGN PATENT DOCUMENTS

| | | |
|---|---|---|
| CN | 00200749 | 1/2000 |
| EP | 1 063 046 A3 | 12/1999 |
| JP | 59-170246 | 9/1984 |
| JP | 11-013951 | 1/1999 |

* cited by examiner

Primary Examiner—George Wyszomierski
(74) Attorney, Agent, or Firm—Scully, Scott, Murphy & Presser

(57) ABSTRACT

In a joining method for a frame of spectacles, and in more particular to a method for joining a bridge or a temple to a lens rim, a joining method for a frame of spectacles comprises deforming a joining portion of a member made of a shape memory alloy material so as to be insertable into a pipe for joining the member to a lens rim, and joining the joining portion of the member to the pipe by returning the joining portion of the member to an original shape before the deformation after the member is inserted into the pipe.

21 Claims, 5 Drawing Sheets

JOINING METHOD FOR FRAME OF SPECTACLES

BACKGROUND OF THE INVENTION

1. Field of the Invention

The present invention relates to a joining method for a frame of spectacles, and in more particular to a joining method for a frame of spectacles by which a member (e.g. bridge and/or temple) is joined to another part (e.g. lens rim) of the frame of spectacles.

2. Description of the Prior Art

Shape memory alloy can have not less than two phases in a solid state, a phase stable at a high temperature is called austenite, and a phase stable at a low temperature is called martensite. And, a temperature at which a phase transformation occurs is called as a transformation temperature.

FIG. 1A illustrates a shape of a shape memory alloy at a temperature higher than a transformation temperature of the alloy. FIG. 1B illustrates the shape memory alloy of FIG. 1A is deformed longitudinally below the transformation temperature. FIG. 1C illustrates the shape memory alloy of FIG. 1A is deformed transversely below the transformation temperature. And, FIG. 1D illustrates a shape of the deformed shape memory alloy of FIGS. 1B or 1C at a temperature above the transformation temperature.

As depicted in FIGS. 1A, 1B and 1C, when the shape memory alloy having a specific shape above transformation temperature is deformed longitudinally or transversely below the transformation temperature, as depicted in FIG. 1D, the phase transformation occurs from martensite into austenite, accordingly the shape memory alloy returns to the original shape, herein the above-mentioned phenomenon is called shape memory effect.

NiTi alloy can have a shape memory effect of 8%, it means when the NiTi alloy having a length of 100 mm is deformed longitudinally so as to have a length not greater than 108 mm and is heated above the transformation temperature, the length of the NiTi alloy is returned to 100 mm.

In the meantime, in some materials, they are deformed by a certain loads without any temperature change and regain the original shape after removing the load, the above-mentioned phenomenon is called superelasticity effect. Accordingly, in a material having superelasticity effect, because a permanent deformation by an outer impact hardly occurs, it is possible to maintain the original shape always.

Shape memory alloy having the shape memory effect or the superelasticity effect can be used for a home appliance, an industrial appliance and a medical appliance, etc. In addition, with the development of a high-technology such as a computer and an information communication, etc., a miniaturization and an automatization technologies for a Ti—Ni group shape memory alloy actuator have been amazingly developed and put to practical use.

FIG. 2 schematically illustrates spectacles.

As depicted in FIG. 2, because a shape memory alloy is pleasant to the touch and is not deformed by an outer force, it is in the spotlight as a material for a frame of spectacles such as a bridge 4 or a temple 5, etc.

Generally, a NiTi alloy used for a frame of spectacles has a transformation temperature within a range of −20° C.~0° C., it means it has the superelasticity effect at a temperature above 0° C.

However, because the NiTi alloy has a high reactivity on oxygen and nitrogen, etc., it is difficult to join directly the bridge 5 or the temple 4 made of the NiTi alloy to the lens rim 1 or the hinge 2 by spot welding.

Accordingly, in order to join the bridge 5 or the temple 4 to the lens rim 1 or the hinge 2, the end of the NiTi alloy bridge 5 is inserted into and joined to a pipe 3 having a good weldability and a small diameter, and the pipe 3 is joined to the lens rim 1 by the spot welding. In addition, the bridge 5 made of a NiTi material is connected to the hinge 2 by the pipe 3 having a small diameter.

In order to join a NiTi alloy material bridge or temple to a pipe, inserting a joining portion of the bridge or the temple into the pipe, compressing and deforming the pipe, namely, a clamping method can be used, but in the method, the joining portion may not come out but turn aside.

In addition, in order to join a temple, a method inserting a wire into a pipe and performing a brazing with hard solder can be used. However, a nickel plating, etc. has to be performed for the brazing. In addition, a temperature rise from the brazing may deteriorate the elasticity of NiTi shape memory alloy, and working surroundings may be deteriorated due to a poisonous gas occurrence, etc. in the brazing.

SUMMARY OF THE INVENTION

In order to solve the above-mentioned problems, it is an object of the present invention to provide a joining method for a frame of spectacles which is capable of easily joining a member (e.g. bridge and/or a temple) of shape memory alloy to a hollow member having hole (e.g. pipe) to be fixed at another part of the frame (e.g. lens rim) of spectacles using shape memory effect.

In order to achieve the above-mentioned object, a joining method for a frame of spectacles in accordance with the present invention includes deforming a joining portion of a member (e.g. bridge and/or temple) made of a shape memory alloy material so as to be inserted into the hole of the hollow member (e.g. pipe) to be fixed at a lens rim for joining the member to the lens rim, and joining the joining portion of the member to the hollow member (e.g. pipe) to be fixed at another part of the frame (e.g. lens rim) by returning the deformed thickness of the joining portion of the member to the original thickness (i.e. shape) before the deformation after the member is inserted into the pipe.

In order to achieve the above-mentioned object, a joining method for a frame of spectacles in accordance with the present invention includes inserting a joining portion of a member made of a shape memory alloy material and having an outer diameter same as or smaller than an inner diameter of a pipe into the pipe for joining the member to a lens rim, deforming the joining portion of the member and the pipe in order to reduce the size of the joining portion and the outer diameter of the pipe, and joining the joining portion of the member to the pipe by returning the joining portion of the member to an original shape before the deformation.

In addition, a frame of spectacles in accordance with the present invention includes a temple or a bridge made of a shape memory alloy material, and a joining pipe joined to a lens rim, wherein a joining portion of the temple or the bridge is deformed so as to be insertable into the pipe, and the joining portion of the member is joined to the pipe by returning to an original shape before the deformation after being inserted into the pipe.

DETAILED DESCRIPTION OF THE PREFERRED EMBODIMENT

Figure 1A:
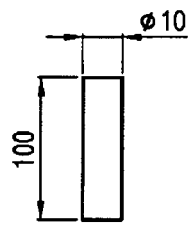
FIG. 1A illustrates a shape of a shape memory alloy higher than a transformation temperature of the alloy.
Figure 1B:
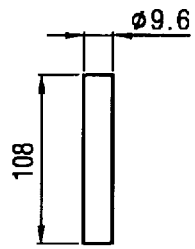
FIG. 1B illustrates the shape memory alloy of FIG. 1A is deformed longitudinally below the transformation temperature.
Figure 1C:
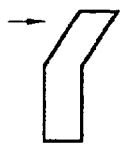
FIG. 1C illustrates the shape memory alloy of FIG. 1A is deformed transversely below the transformation temperature.
Figure 1D:
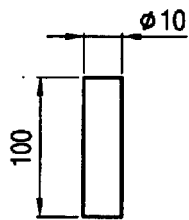
FIG. 1D illustrates a shape of the deformed shape memory alloy of FIGS. 1B or 1C above the transformation temperature.
Figure 2:
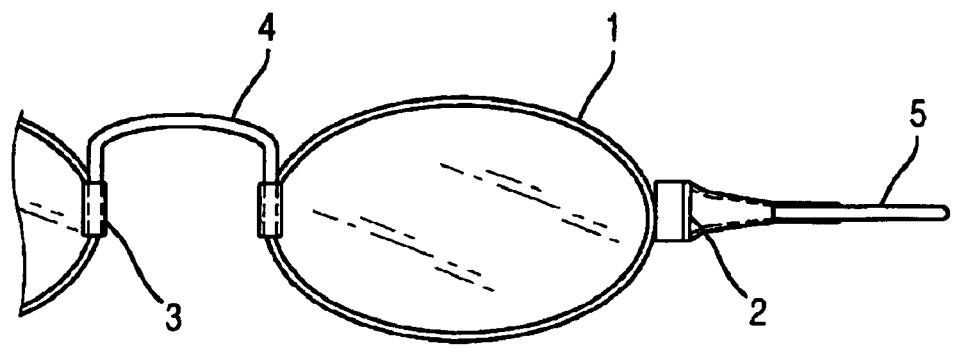
FIG. 2 schematically illustrates spectacles.
Figure 3A:
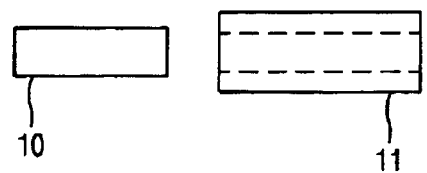
FIGS. 3A, 3B, 3C and 3D illustrate joining processes of a frame of spectacles in accordance with the present invention.
Figure 3B:
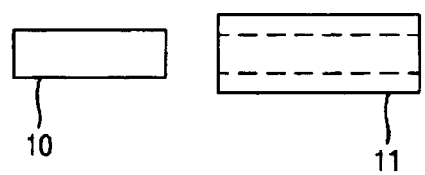
Figure 3C:
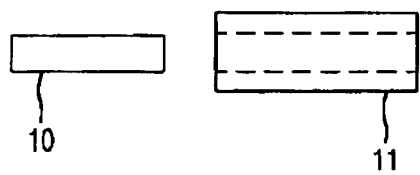
Figure 3D:
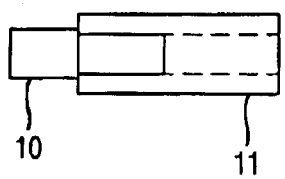

Hereinafter, a joining method for a frame of spectacles in accordance with the present invention will be described in detail with reference to accompanying drawings.

In joining a bridge or a temple to a lens rim by using a pipe, if it is possible to insert the bridge or the temple having a diameter larger than an inner diameter of a pipe to the pipe, the joining can be very strong. In common metals, it is almost impossible to perform, but it can be performed in a shape memory alloy by using shape memory effect.

FIGS. 3A, 3B, 3C and 3D illustrate joining processes of a frame of spectacles in accordance with the present invention.

In more detail, as depicted in FIGS. 3A, 3B, 3C and 3D, in order to insert a shape memory alloy member 10 such as a NiTi alloy into a pipe 11 having an inner diameter a little smaller than an outer diameter of the shape memory alloy member 10, a deforming step for reducing the outer diameter of the member 10 is performed. And, when the member 10 is inserted into the inner diameter of the pipe 11, it is preferable to form the member 10 so as to fit in the pipe 11 perfectly.

In order to reduce the outer diameter of the member 10, there is a deformation method using shape memory effect of shape memory alloy reducing the diameter of the member 10 by cooling the member 10 at a temperature lower than the transformation temperature of the member, and there is a deformation method using superelasticity effect reducing the diameter of the member 10 without a temperature change.

After inserting the member 10 into the pipe 11, by the shape memory effect or the superelasticity effect, the diameter of the member 10 tends to return to the original shape (i.e. to the thicker diameter), however, a joining portion of the member 10 inserted into the pipe 11 can not be increased because of interferences with the inner surface of the pipe 11. For example, in a case using the shape memory effect, the member 10 returns to the original shape according to a rise of temperature not less than the transformation temperature, in a case using the superelasticity effect, the member 10 returns to the original shape as a certain time has passed. Accordingly, the member 10 and the pipe 11 are rightly contacted each other and strongly joined.

A method for reducing the diameter of the joining portion of the member 10 will be described.

By cooling members using such as liquid nitrogen, ice or dry ice, the outer diameter of a pipe and the joining portion of a member such as a bridge or a temple, etc. are cooled.

After the cooling, processes such as a groove rolling process using a roller having a plurality of grooves and a swaging process hitting the outer surface of the member 10 with a hammer while the member 10 is rotated can be used so as to reduce the diameter (for example, from 1.04 mm to 1.00 mm) of the joining portion of the member 10 in order to insert the end of the member 10 to the pipe 11. However, because it is difficult to get an exact circle, it is required to be proficient in the process.

Accordingly, a deforming device for deforming the joining portion of the member 10 such as a bridge or a temple, etc. in order to insert it into the pipe 11 which is capable of easily adjusting a quantity of deformation and getting an exact circle is provided in the present invention, it is constructed with not less than three rolls, and at least one roll has a movable shaft.

Figure 4:
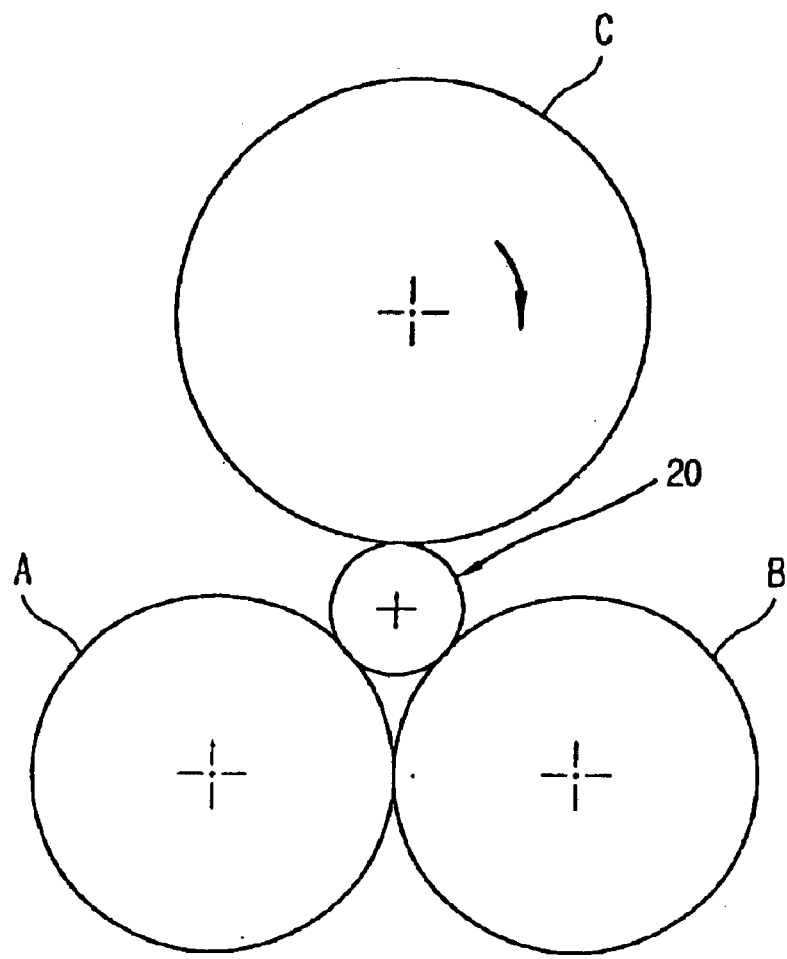
FIG. 4 schematically illustrates a device for deforming a joining portion of a member in accordance with the present invention.

FIG. 4 schematically illustrates a deforming device for deforming a joining portion of a member in accordance with the present invention.

As depicted in FIG. 4, the deforming device comprises three rolls A, B, C at the circumstances of the member 10. Herein, the two rolls A, B are fixed, and the roll C having a movable shaft is moved. Accordingly, by varying a distance from the rolls B and C by using the roll C, a thickness, namely, the outer diameter of the member 10 can be adjusted by adjusting a degree of processing. The two rolls A, B are for fixing the member 10.

In the meantime, before the joining portion of the member 10 is inserted into the pipe 11, because the pipe 11 is heated in order to expand the inner diameter of the pipe 11, the joining can be performed more easily, accordingly an operation efficiency can be improved.

And, the shape memory alloy can have both or one of the shape memory effect and the superelasticity effect. In addition, including a NiTi alloy, a C—Zn—Al alloy or a Cu—Al—Ni alloy or a Fe—Mn—Si alloy, etc. can be used as the shape memory alloy.

In the NiTi alloy, it can have the shape memory effect of about 8%. Herein, if a member having a length of 100 mm is deformed so as to have a length of less than 108 mm, it can completely return to the original shape having the length of 100 mm when it is heated. In the meantime, when the member has the superelasticity effect, if the member is deformed by an outer force within a specific range without any temperature variation, it can return to the original shape by removing the outer force.

In the meantime, in order to join a member such as a bridge or a temple, etc. to a frame of spectacles, a joining portion is deformed before it is inserted into a pipe. However, in another embodiment of the present invention, in order to join a member such as a bridge or a temple, etc. to a frame of spectacles, after the joining portion of the member having the almost same outer diameter with the inner diameter of the pipe is inserted into the pipe, a deformation for reducing the outer diameter of the pipe is performed.

In more detail, after inserting the joining portion having the almost same outer diameter as the inner diameter of the pipe into the pipe, the joining portion is cooled at a temperature lower than the transformation temperature, and reducing the outer diameter of the pipe is performed. And, according to a temperature rise (at a room temperature), the joining portion made of a shape memory alloy returns to the original shape, the pipe maintains the deformed state, accordingly the joining portion and the pipe can be strongly joined.

Hereinafter, examples of the joining method for the rim of the pair of spectacles in accordance with the present invention will be described in more detail.

FIGS. 5A, 5B, 5C and 5D schematically illustrate examples of the joining method for the rim of the pair of spectacles in accordance with the present invention.

EXAMPLES

The present invention will be described in more detail by way of the following examples, but those examples are given for the purpose to illustrate the present invention, not to limit the scope of it.

Example 1

Figure 5A:
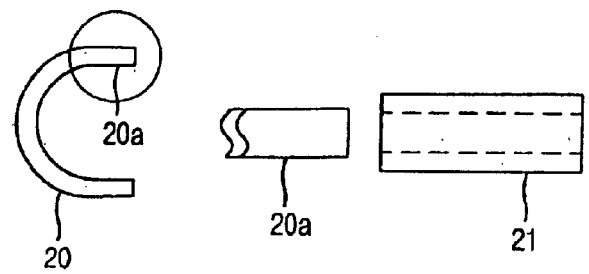
FIGS. 5A, 5B, 5C and 5D schematically illustrate joining processes of a frame of spectacles in accordance with the present invention.
Figure 5B:
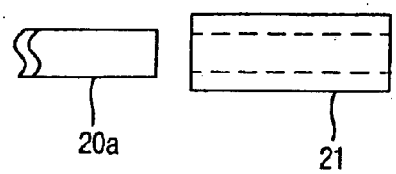
Figure 5C:
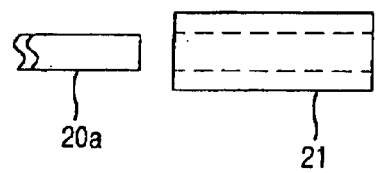
Figure 5D:
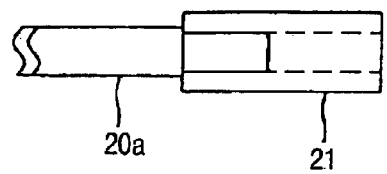

As depicted in FIG. 5A, by using CNC, a bridge 20 made of a NiTi alloy (Ni of 51% Wt, Ti of 49% Wt) is formed as a U shape having a diameter of 1.04 mm, and it is heated at a temperature of 400~600° C., accordingly the shape of the bridge 20 is memorized. Herein, because its transformation temperature is −10° C., the bridge 20 has a very good elasticity at a room temperature. However, because it is transformed into martensite below −10° C., the transformation temperature, it can be easily deformed, and it returns to the original shape at a temperature over −10° C., in other words, the shape memory effect occurs.

A joining portion 20a of the bridge 20 processed, by the deformation method as depicted in FIG. 4, so as to have the diameter not less than 1.00 mm in the Martensite is inserted into the pipe 21. At the room temperature not less than the transformation temperature, the joining portion 20a of the bridge 20 tends to return to the original shape (diameter of 1.04 mm) by the shape memory effect, but it is restricted by the inner diameter of the pipe 21, accordingly the joining portion 20a of the bridge 20 can be perfectly joined to the pipe 21. In more detail, it is same as the member (the joining portion 20a of the bridge 20) having the diameter of 1.04 mm is forcibly inserted into the pipe having the inner diameter of 1.00 mm.

Ten samples are produced by the method. In test results, each bridge is perfectly bonded to each lens rim without coming out or being twisted.

Temples can be joined to a pipe coupled to a hinge by the above-described method.

Example 2

A joining portion of a bridge made of a NiTi alloy having a diameter of 1.04 mm is inserted into a pipe having an inner diameter of 1.04 mm. A processing device and the bridge are cooled (at −30° C.), and the bridge is processed so as to have the inner diameter of 1.00 mm.

Herein, the joining portion of the bridge is also processed so as to have the inner diameter of 1.00 mm. When a temperature rises, the bridge made of the shape memory alloy is transformed into austenite and tries to return to the original shape, and the pipe maintains the deformed state. Accordingly, the joining portion of the bridge is perfectly bonded to the pipe.

Example 3

A joining portion of a bridge made of a NiTi material having a diameter of 1.04 mm is inserted into a pipe having an inner diameter of 1.04 mm. The pipe is processed in Austenite so as to have the inner diameter of 1.00 mm. Herein, the joining portion of the bridge is also processed so as to have a diameter of 1.00 mm. After a certain time has passed, the bridge made of the shape memory alloy having a superelasticity effect returns to the original shape, the pipe maintains the deformed state. Accordingly, the joining portion of the bridge is perfectly bonded to the pipe.

In a joining method for a frame of spectacles in accordance with the present invention, a member made of a shape memory material such as a TiNi alloy, etc. is inserted into a pipe and joined by using a shape memory effect, it is possible to join strongly the rim and a joining process can be facilitated. Accordingly, it is advantageous to production costs.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of joining at least one joining portion of a member forming a frame of spectacles to a hollow member to be fixed at another part of the frame of spectacles comprising:
   a step of cooling the joining portion of the member, which is made of a shape memory alloy below the transformation temperature of the shape memory alloy;
   a step of deforming the joining portion of the member to reduce the thickness below the transformation temperature of the shape memory alloy;
   a step of inserting the joining portion of the member into a hole of the hollow member which is not made of shape memory alloy below the transformation temperature of the shape memory alloy; and
   a step of bonding the joining portion of the member with the hollow member by heating over the transformation temperature of the shape memory alloy.

2. The method of joining of claim 1, wherein the hollow member is an annular pipe, and the cross-section shape of the member is a circle.

3. The method of joining of claim 2, wherein the diameter of the joining portion of the member is larger than the inner diameter of the annular pipe below the transformation temperature of the shape memory alloy, while the diameter of the joining portion of the member is smaller than or equal to the inner diameter of the annular pipe over the transformation temperature of the shape memory alloy.

4. The method of joining of claim 1, wherein the shape memory alloy is a NiTi alloy.

5. A method of joining at least one joining portion of a member forming a frame of spectacles to a hollow member to be fixed at another part of the frame of spectacles comprising:
   a step of deforming the joining portion of the member, which is made of a superelastic alloy to reduce the thickness;
   a step of inserting the joining portion of the member into the hole of the hollow member which is not made of superelastic alloy before returning to the original thickness of the joining portion; and a step of bonding the joining portion of the member with the hollow member by letting the joining portion of the member return to its original thickness.

6. The method of joining of claim 5, wherein the hollow member is an annular pipe, and the cross-section shape of the member is a circle.

7. The method of joining of claim 5, wherein the shape memory alloy is a NiTi alloy.

8. A method of joining at least one joining portion of a member forming a frame of spectacles to a hollow member being fixed at another part of the frame of spectacles comprising:
    a step of inserting the joining portion of the member, which is made of a shape memory alloy into the hole of the hollow member which is not made of shape memory alloy;
    a step of cooling both the joining portion of the member and the hollow member below the transformation temperature of the shape memory alloy;
    a step of deforming the hollow member as well as the joining portion of the member inserted therein to reduce the thickness thereof below the transformation temperature of the shape memory alloy by loads on the outer surface of the hollow member; and
    a step of bonding the joining portion of the member with the hollow member by heating over the transformation temperature of the shape memory alloy.

9. The method of joining of claim 8, further comprising:
    the hollow member being fixed at another said part of the frame of spectacles after the step of inserting said joining portion of said member is implemented.

10. The method of joining of claim 8, further comprising:
    the hollow member being fixed at another said part of the frame of spectacles after the step of bonding the joining portion of said member is implemented.

11. The method of joining of claim 8, wherein the hollow member is an annular pipe, and the cross-section shape of the member is a circle.

12. The method of joining of claim 11, wherein the diameter of joining portion of the member is larger than the inner diameter of the annular pipe below the transformation temperature of the shape memory alloy, while the diameter of joining portion of the member is smaller than or equal to the inner diameter of the annular pipe over the transformation temperature of the shape memory alloy.

13. The method of joining of claim 8, wherein the shape memory alloy is a NiTi alloy.

14. The method of joining of claim 8, wherein both the joining portion of the member and the hollow member is deformed by a groove rolling process using a roller having a plurality of grooves on the surface in the step of deforming.

15. The method of joining of claim 8, wherein both the joining portion of the member and the hollow member is deformed by a swaging process rotating and hitting the outer surface of the hollow member containing the joining portion therein with a hammer in the rotation in the step of deforming.

16. A method of joining at least one joining portion of a member forming a frame of spectacles to a hollow member to be fixed at another part of the frame of spectacles comprising:
    step of inserting the joining portion of the member, which is made of a superelastic alloy into the hole of the hollow member which is not made of superelastic alloy;
    a step of deforming the hollow member as well as the joining portion of the member inserted therein to reduce the thickness thereof by loads on the outer surface of the hollow member; and
    a step of bonding the joining portion of the member with the hollow member by letting the joining portion of the member return to its original thickness.

17. The method of joining of claim 16, wherein the hollow member is deformed over the elastic range, while the joined portion is deformed within the elastic range in the step of deforming.

18. The method of joining of claim 17, wherein the hollow member is an annular pipe, and the cross-section shape of the member is a circle.

19. The method of joining of claim 18, wherein the diameter of joining portion of the member is larger than the inner diameter of the annular pipe before the step of deforming, and the diameter of joining portion of the member is smaller than or equal to the inner diameter of the annular pipe after the step of deforming.

20. The method of joining of claim 16, wherein the superelastic alloy is a NiTi alloy.

21. The method of joining of claim 16, wherein in the step of deforming both the joining portion of the member and the hollow member are deformed by a groove rolling process using a roller having a plurality of grooves on the surface.

* * * * *